(12) United States Patent
Shirey et al.

(10) Patent No.: US 8,157,222 B1
(45) Date of Patent: Apr. 17, 2012

(54) WIRE HARNESS CLAMP

(75) Inventors: Christa Lynn Shirey, Garden City, MI (US); Yuko Haba Miki, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 12/915,929

(22) Filed: Oct. 29, 2010

(51) Int. Cl.
*F16L 3/08* (2006.01)
(52) U.S. Cl. .................. 248/74.1; 248/68.1; 248/71
(58) Field of Classification Search .......... 248/74.1, 248/68.1, 71, 73, 74.4
See application file for complete search history.

(56) References Cited

U.S. PATENT DOCUMENTS

| | | | |
|---|---|---|---|
| 3,980,263 A * | 9/1976 | Okuda | 248/73 |
| 4,386,752 A | 6/1983 | Pavlak et al. | |
| 4,609,171 A | 9/1986 | Matsui | |
| 4,635,886 A | 1/1987 | Santucci et al. | |
| 4,669,688 A * | 6/1987 | Itoh et al. | 248/74.2 |
| 4,762,296 A | 8/1988 | Kraus et al. | |
| 4,917,340 A * | 4/1990 | Juemann et al. | 248/74.2 |
| 5,277,387 A | 1/1994 | Lewis et al. | |
| 5,474,268 A | 12/1995 | Yu | |
| 5,535,969 A * | 7/1996 | Duffy, Jr. | 248/68.1 |
| 5,906,342 A | 5/1999 | Kraus | |
| 6,206,331 B1 | 3/2001 | Keith et al. | |
| 6,561,465 B2 * | 5/2003 | Kondo | 248/74.3 |
| 6,747,209 B2 | 6/2004 | Uchida et al. | |
| 7,140,070 B2 | 11/2006 | Yuta et al. | |
| 7,866,612 B2 * | 1/2011 | Doi et al. | 248/71 |
| 2004/0046088 A1 | 3/2004 | Uchida et al. | |
| 2009/0236486 A1 | 9/2009 | Matsuno et al. | |

FOREIGN PATENT DOCUMENTS

| | | |
|---|---|---|
| EP | 2103821 A2 | 9/2009 |
| JP | 02068942 A | 3/1990 |
| JP | 08047146 A | 2/1996 |
| JP | 08126169 A | 5/1996 |
| JP | 2007185057 A | 7/2007 |
| JP | 2009044937 A | 2/2009 |

* cited by examiner

*Primary Examiner* — Anita M King

(74) *Attorney, Agent, or Firm* — Girfford, Krass, Sprinkle, Anderson & Citkowski, P.C.

(57) ABSTRACT

A wire harness clamp with at least a pair of tension members that afford for harnesses having different sizes to be held securely by the clamp is provided. In addition, the wire harness clamp can have a length that can protect wire harnesses held within the clamp from proximate objects that can rub, vibrate, etc., against the wire harnesses.

17 Claims, 3 Drawing Sheets

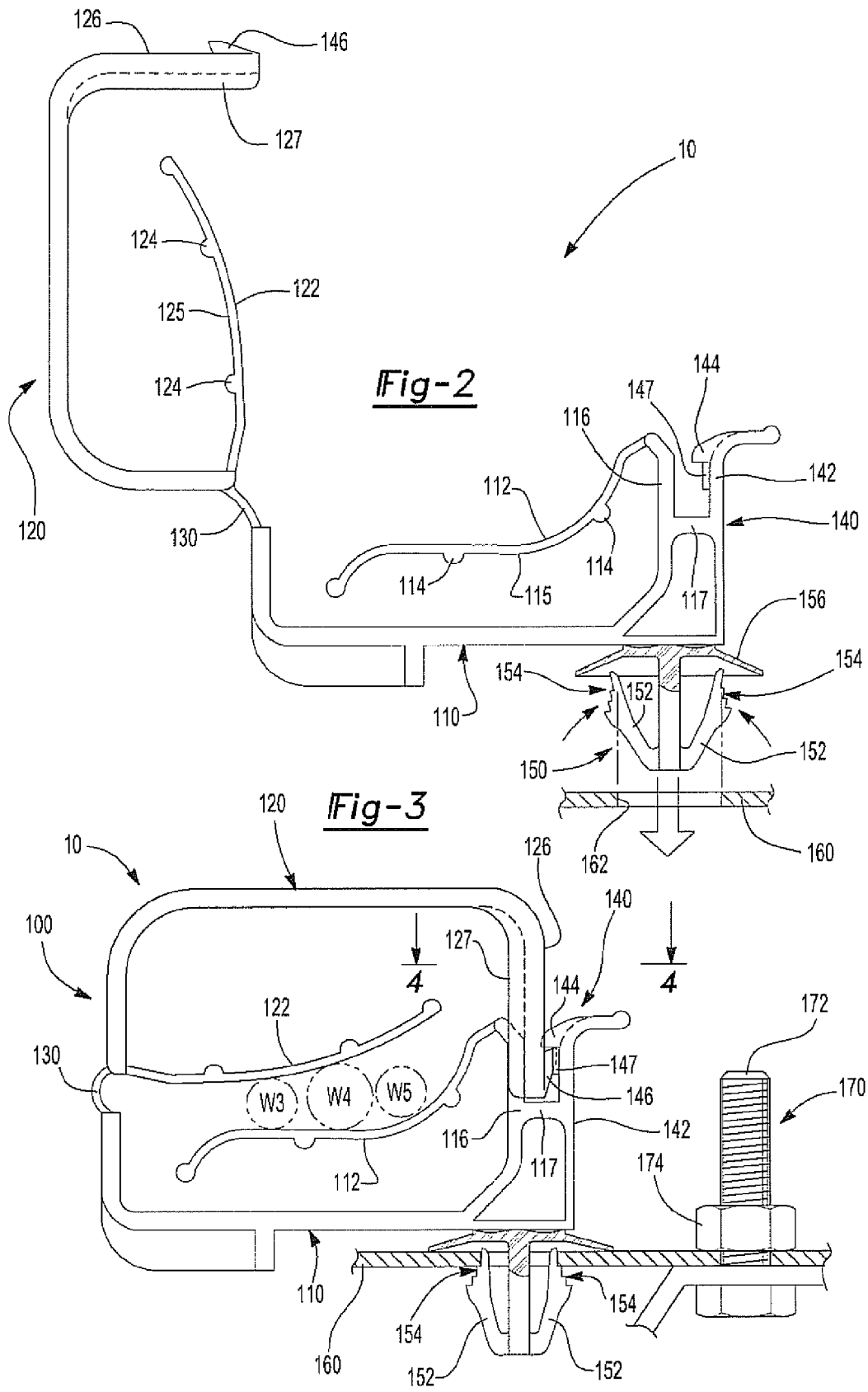

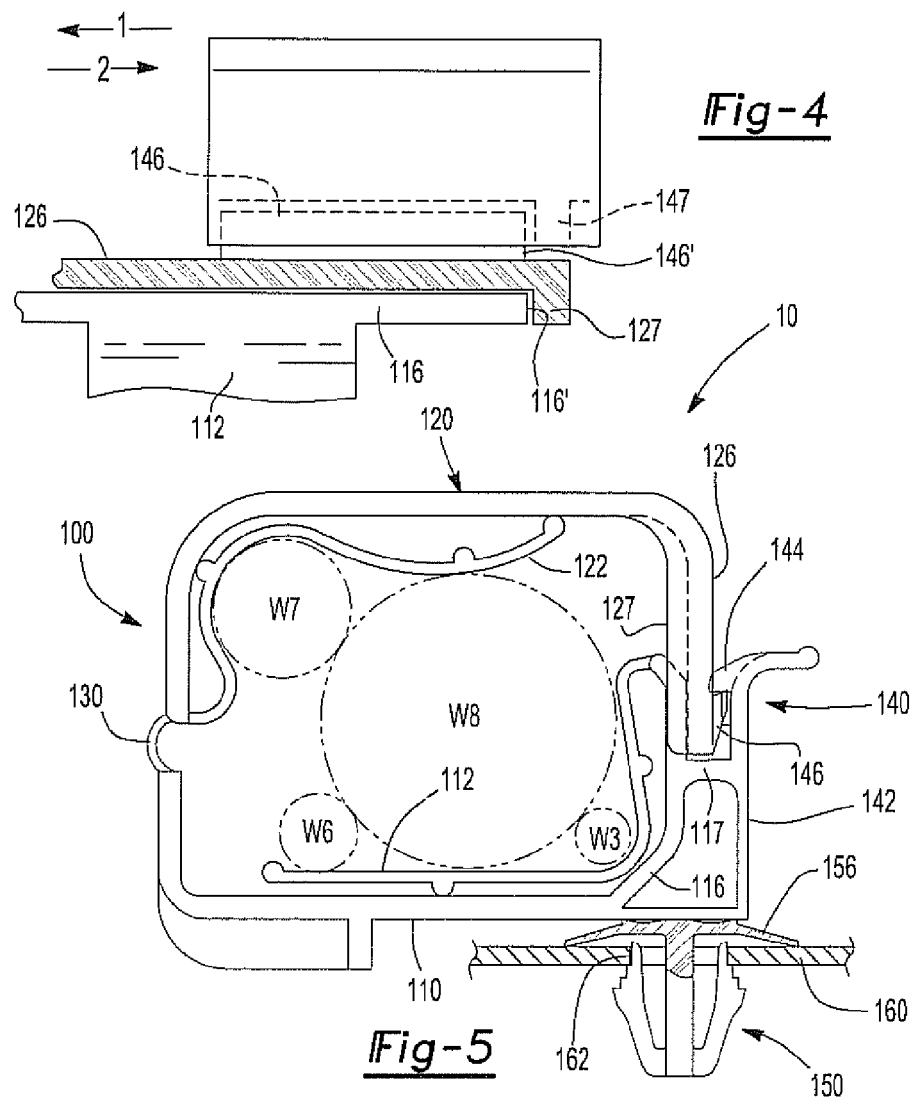
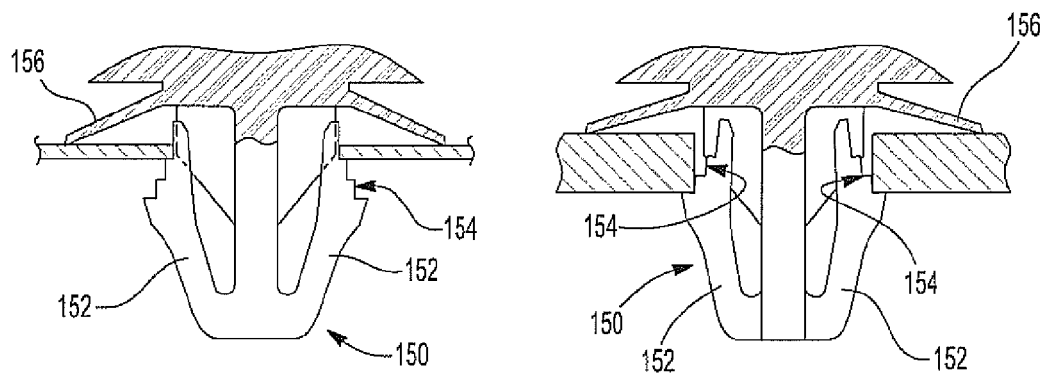

WIRE HARNESS CLAMP

FIELD OF THE INVENTION

The present invention is related to a wire harness clamp, and in particular, a wire harness clamp having a pair of oppositely disposed flexible members operable to apply tension to one or more wire harnesses within the wire harness clamp.

BACKGROUND OF THE INVENTION

The use of wire harnesses for electrical wiring of machines, motor vehicles, aircraft, water vehicles and the like is known. In addition, as machines, vehicles, etc., continue to employ more and more electronic devices for operation and/or safety, the number of wire harnesses used as part of or within such equipment continues to increase.

Wire harness clamps that can guide and/or restrict the placement of wire harnesses and thereby prevent entanglement, misplacement and the like are also known. And, heretofore wire harness clamps have attempted to be adjustable in the number and size of wire harnesses that can fit therewithin and be held thereby. However, such wire harness clamps have exhibited limited success and have not provided adequate protection to wire harnesses held therewithin against surrounding and/or proximate objects that can rub or vibrate against the wire harnesses and cause damage thereto. As such, an improved wire harness clamp that provides protection to wire harnesses held therewithin from surrounding objects and is flexible with respect to the number and/or size of the wire harnesses that can be clamped and held would be desirable.

SUMMARY OF THE INVENTION

The present invention discloses a wire harness clamp with at least a pair of tension members that afford for accommodation of one or more wire harness having the same or different sizes to be held securely by the clamp. In addition, the wire harness clamp has a length that can protect wire harness (es) held within the clamp from surrounding objects that can rub, vibrate, etc., against the wire harness(es).

The wire harness clamp can include a first half and a second half with a hinge located therebetween. The hinge is operable for the second half to open and close relative to the first half. A first flexible member can extend from the first half and a second flexible member can extend from the second half, the first flexible member extending in an opposite direction from the second flexible member.

The first half and the second half can form a generally rectangular shaped clamp having a length greater than 2 centimeters and operable to protect one or more wire harnesses held within the clamp from a bolt or stud proximate thereto. In some instances, the length is greater than 3 centimeters.

The first flexible member and the second flexible member can each have a width and each width can be at least 30% of the generally rectangular shaped clamp length. In addition, the first and second flexible members can have a rib extending along their width and thereby provide structural support thereto.

The wire harness clamp can further include a latch that is operable to attach the second half to the first half in a closed position. The latch can include a catch tab extending from the second half and a catch lever extending from the first half. It is appreciated that the catch tab is operable to engage the catch lever, and vice versa, in order to hold the second half in the closed position. In addition, the second half can have an alignment flange that abuts against the first half when the second half is in the closed position and thus prevents the second half from sliding in a first direction. Likewise, the catch lever can have an alignment tab that abuts against the catch tab and prevents the second half from sliding in a second direction.

The wire harness clamp can also have an attachment stud that extends from the first half and is operable to attach the wire harness clamp to a separate member. For example, the separate member can be a sheet member and the attachment stud can have a ridged catch member that engages the sheet member. In some instances, the ridged catch member can have a plurality of cascading ridges that are operable to engage sheet members of different thicknesses.

BRIEF DESCRIPTION OF THE DRAWINGS

FIG. 2 is an end view of the wire harness clamp shown in FIG. 1 illustrating the clamp in an open position;

FIG. 3 is an end view of the wire harness clamp shown in FIG. 1 illustrating the clamp in a closed position;

FIG. 4 is a cross-sectional view of the section 4-4 shown in FIG. 3;

FIG. 5 is an end view of the wire harness clamp shown in FIG. 1 illustrating the clamp holding a plurality of wire harnesses with different sizes;

FIG. 6 is a cross-sectional view of an attachment stud for the wire harness clamp engaging a sheet member; and FIG. 7 is a cross-sectional view of the attachment stud engaging a sheet member of a different thickness than in FIG. 6.

DETAILED DESCRIPTION OF THE INVENTION

Figure 1:
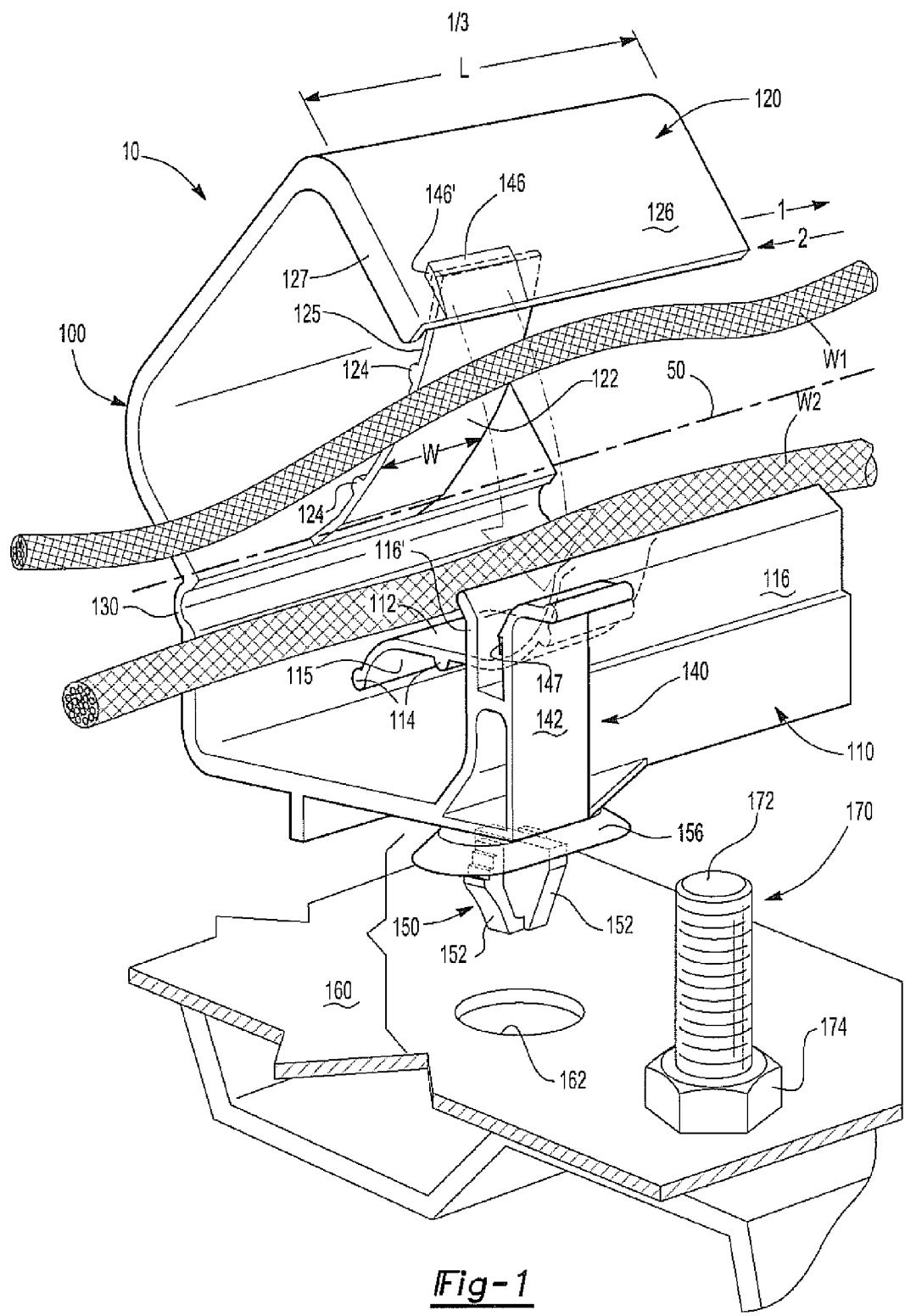
FIG. 1 is a perspective view of a wire harness clamp according to an embodiment of the present invention.

The present invention discloses a wire harness clamp that affords for sufficient tension to hold one or more wire harnesses therewithin. As such, the present invention has utility as a component for a motor vehicle.

The wire harness clamp can have a generally rectangular shape with at least two flexible members that apply tension and adequately hold one or more wire harnesses held within the clamp. The clamp has a first half and a second half with a hinge therebetween, the hinge operable for the second half to open and close relative to the first half.

The flexible members can include a first flexible member that extends from the first half and a second flexible member that extends from the second half. In some instances, the generally rectangular shaped clamp has a length that is greater than 2 centimeters, the length of the clamp being operable to protect one or more wire harnesses held within the clamp from a bolt, stud, etc. that is proximate to the wire harness clamp. In other instances, the length of the generally rectangular shaped clamp is greater than 3 centimeters.

Each of the flexible members can have a width that is at least 30% of the length of the clamp. In this manner, the flexible members have sufficient tension and/or surface area to securely hold wire harnesses within the clamp. In addition, each of the flexible members can have a rib extending therefrom which can provide structural support to the members.

The wire harness clamp can also have a latch that is operable to attach the second half to the first half in a closed position. The latch can include a catch tab that extends from the second half and a catch lever that extends from the first half. The catch tab is operable to engage the catch lever and thus hold the second half in the closed position.

The wire harness clamp can also include an attachment member such as an attachment stud which can extend from the first half of the clamp and attach the clamp to a separate member. For example and for illustrative purposes only, the separate member can be a sheet member, a piece of sheet metal, a panel, and the like. The attachment stud can have a ridged catch member that affords for the attachment stud to extend at least partially through an aperture within the separate member and engage the underside thereof. In some instances, the ridged catch member can have a plurality of cascading ridges that allow the attachment stud to engage separate members having different thicknesses.

Turning now to FIGS. 1-3, perspective and end views of a wire harness clamp according to an embodiment of the present invention are shown generally at reference numeral 10. The wire harness clamp 10 can include a body 100 having a first half 110 and a second half 120. The first half 110 can have a first flexible member 112 that extends therefrom in an inwardly direction. For the purposes of the present invention, the term "inwardly" refers to the direction pointing or traveling towards an inner axis 50 of the clamp 10. In addition, the term "outwardly" refers to the direction pointing or traveling away from the inner axis 50. The first flexible member 112 can have one or more ribs 114 that may or may not extend from an outer surface 115 of the first flexible member 112. The first half 110 can also include a first closing side 116 that has an end 116'.

The second half 120 can have a second flexible member 122 extending in an inwardly direction therefrom, the second flexible member 122 optionally having one or more ribs 124 extending from an outer surface 125. Both the first flexible member 112 and the second flexible member 122 can be located directly opposite each other within the first half 110 and second half 120, respectively, and each have a width W that can add to the rigidity, surface area, and the like to securely hold one or more wire harnesses within the clamp 10. For example and for illustrative purposes only, a wire harness W1 and a wire harness W2 as shown in FIG. 1 can be held within the clamp 10 by opposing first flexible member 112 and second flexible member 122. The second half 120 can also have a second closing side 126 with an alignment flange 127 extending in an inwardly direction.

Between the first half 110 and the second half 120 can be a hinge 130 which affords for the second half 120 to move between an open position and a closed position relative to the first half 110. In some instances, the hinge 130 can be a living hinge as is known to those skilled in the art.

The wire harness clamp 10 can include a latch 140 that affords for the second half 120 to be held securely in a closed position relative to the first half 110. The latch 140 can include a catch lever 142 that is spaced apart from the first closing side 116. The catch lever 142 can have a catch flange 144 and an alignment tab 147. In some instances, a spacer support 117 extends between the first closing side 116 and the catch lever 142.

The latch 140 can also include a catch tab 146 that extends from the second closing side 126 of the second half 120. It is appreciated that the catch tab 146 can engage the catch flange 144, and vice versa. In this manner, the second half is latched or attached to the first half in a secure manner.

In addition to attaching the second half 120 to the first half 110, the clamp 10 affords for alignment of the two halves relative to each other as illustrated in FIG. 4. For example, the alignment flange 127 can abut against the end 116' of the first closing side 116 and thus prevent the second half 120 from moving in a first direction 1 relative to the first half 110. In addition, the alignment tab 147 can abut against an end 146' of the catch tab 146 and thus prevent movement of the second half 120 in a second direction 2 relative to the first half 110.

The wire harness clamp 10 can also include an attachment member such as an attachment stud 150. The attachment stud 150 can have one or more flanges 152 that have an inclined surface. The inclined surface affords for the attachment flanges 152 to slide at least partially through an aperture 162 of a separate member 160. In addition, the attachment flange 150 can be a ridged member having a cascade of ridges 154. As shown particularly in FIGS. 6 and 7, the cascade of ridges 154 can have a reducing distance between each other and thereby afford for engagement of the attachment flanges 152 with separate members such as sheet metal having different thicknesses. In combination with a tension flange 156, the attachment flanges 152 provide for secure attachment of the clamp 10 to the separate member 160.

As shown in FIGS. 3 and 5, the first flexible member 112 and the second flexible member 122 provide for secure holding of one or more wire harnesses having the same or different sizes. For example, FIG. 3 illustrates the flexible members holding three wire harnesses W3, W4, W5 which have similar diameters. In contrast, FIG. 5 illustrates how the first flexible member 112 and the second flexible member 122 can hold wire harnesses W3, W6, W7, W8 having significantly different diameters. In this manner, the wire harness clamp 10 has a versatile function and can be used for different models of machinery that incorporate different numbers, amounts, sizes, etc. of wire harnesses depending upon the electronic devices included with a specific model.

The wire harness clamp 10 can also have an extended length L that affords for protection of wire harnesses held therewithin from a proximate member 170 that could rub, vibrate, etc., against the wire harnesses. For example and for illustrative purposes only, the proximate member 170 could be a stud/bolt 172 with or without a nut 174. The length L of the wire harness clamp can be sufficiently long such that movement and/or vibration of the clamp 10 and/or the separate member 170 does not result in contact between the wire harnesses held within the clamp 10 and the separate member 170. For example and for illustrative purposes only, the length L of the wire harness 10 can be greater than 2 centimeters, or in the alternative, greater than 3 centimeters.

The wire harness clamp 10 can be made from any material known to those skilled in the art, illustratively including metals, alloys, polymers, and combinations thereof. In addition, the invention is not restricted to the illustrative examples and embodiments described above. The examples and embodiments are not intended as limitations on the scope of the invention. Processes, apparatus, compositions, and the like described herein are exemplary and not intended as limitations on the scope of the invention. Changes herein and other uses will occur to those skilled in the art. The scope of the invention is defined by the scope of the claims.

We claim:

1. A wire harness clamp comprising:
   a first half and a second half;
   a hinge between said first half and said second half, said hinge operable for said second half to open and close relative to said first half;
   a single first flexible member extending from said first half; and
   a single second flexible member extending from said second half, said single first flexible member and said single second flexible member located directly opposite each other within said first half and said second half, and operatively arranged to apply tension in opposite directions onto one or more wire harnesses located between said single first flexible member and said single second flexible member when said second half is closed relative to said first half.

2. The wire harness clamp of claim 1, wherein said first half and said second half form a generally rectangular shaped clamp.

3. The wire harness clamp of claim 2, wherein said generally rectangular shaped clamp has a length greater than 2 centimeters operable to protect the one or more wire harnesses from a bolt or stud proximate said wire harness clamp.

4. The wire harness clamp of claim 3, wherein said length is greater than 3 centimeters.

5. The wire harness clamp of claim 1, wherein said hinge is a living hinge extending from said first half and said second half.

6. The wire harness clamp of claim 3, wherein said first flexible member and said second flexible member each have a width, each width being at least 30% of said generally rectangular shaped clamp length.

7. The wire harness clamp of claim 6, wherein said first flexible member and said second flexible member each have a rib extending along said width.

8. The wire harness clamp of claim 7, wherein said rib on said first flexible member and said rib on said second flexible member are both on an outwardly facing surface of said first and second flexible member.

9. The wire harness clamp of claim 1, further comprising a latch, said latch operable to attach said second half to said first half in a closed position.

10. The wire harness clamp of claim 9, wherein said latch has a catch tab extending from said second half and a catch lever extending from said first half, said catch tab operable to engage said catch lever and hold said second half in said closed position.

11. The wire harness clamp of claim 10, wherein said catch lever has a catch flange extending therefrom, said catch flange operable to engage said catch tab and hold said second half in said closed position.

12. The wire harness of claim 1, wherein said second half has an alignment flange abutting against said first half when said second half is in said closed position and operable to prevent said second half from sliding in a first direction.

13. The wire harness of claim 12, wherein a catch lever has an alignment tab abutting against a catch tab when said second half is in said closed position and operable to prevent said second half from sliding in a second direction.

14. The wire harness clamp of claim 1, further comprising an attachment stud extending from said first half, said attachment stud operable to attach said wire harness clamp to a separate member.

15. The wire harness clamp of claim 14, wherein the separate member is a sheet metal member.

16. The wire harness clamp of claim 15, wherein said attachment stud has a ridged catch member, said ridged catch member operable to engage said sheet metal member.

17. The wire harness clamp of claim 16, wherein said ridged catch member has a plurality of cascading ridges operable to engage sheet metal members of different thicknesses.

* * * * *